(12) United States Patent
Pass

(10) Patent No.: US 7,062,484 B2
(45) Date of Patent: Jun. 13, 2006

(54) INTERACTIVE WIRELESS DEVICES TO ON-LINE SYSTEM

(76) Inventor: Dwayne A. Pass, 1463 Oakfield Dr., Brandon, FL (US) 33511

( * ) Notice: Subject to any disclaimer, the term of this patent is extended or adjusted under 35 U.S.C. 154(b) by 181 days.

(21) Appl. No.: 10/616,758

(22) Filed: Jul. 10, 2003

(65) Prior Publication Data

US 2004/0078354 A1 Apr. 22, 2004

Related U.S. Application Data

(63) Continuation of application No. 09/548,772, filed on Apr. 13, 2000, now abandoned.

(60) Provisional application No. 60/129,734, filed on Apr. 16, 1999.

(51) Int. Cl.
*G06F 17/30* (2006.01)

(52) U.S. Cl. ............. 707/3; 707/9; 707/10; 707/104.1; 709/219

(58) Field of Classification Search .............. 707/1–10, 707/100–104.1, 200–206; 709/227–229, 709/217–219; 455/422.1
See application file for complete search history.

(56) References Cited

U.S. PATENT DOCUMENTS

| 5,706,427 | A | * | 1/1998 | Tabuki ........................ 713/201 |
| 6,092,111 | A | * | 7/2000 | Scivier et al. .............. 709/227 |
| 6,292,657 | B1 | * | 9/2001 | Laursen et al. ............. 709/225 |

* cited by examiner

Primary Examiner—Jean M. Corrielus
Assistant Examiner—Isaac M. Woo
(74) Attorney, Agent, or Firm—Dennis L. Cook, Esq.

(57) ABSTRACT

A two-way wireless device and wireless internet system is adapted for interactive communications between a subscriber using a wireless device, a wireless server, and an on-line service using a web page for the input of information. Systems are disclosed for stock transaction trading wherein a subscriber, using wireless E-mail or a pager, interfaces to any one of numerous on-line stock trading services through a wireless server which uses agents, artificial intelligence software subroutines, which have been programmed to interact like a human using a web site, for E-mail alerts and stock trading.

4 Claims, 1 Drawing Sheet

INTERACTIVE WIRELESS DEVICES TO ON-LINE SYSTEM

CROSS-REFERENCE TO RELATED APPLICATION

Continuation of prior application No.: 09/548,772 filed on Apr. 13, 2000, now abandoned.

The present application claims the benefit of previously filed Provisional Patent Application, Ser. No. 60/129,734, filed Apr. 16, 1999.

FIELD OF THE INVENTION

The invention disclosed is an improvement in the field of interactive communications with the global information network, and more specifically is a two-way wireless device, or wireless E-mail system, adapted for interactive communications between a subscriber using a wireless device, a wireless interactive server, and an on-line service using a web pages for the input of information.

BACKGROUND OF THE INVENTION

One of the fastest growing areas of technology is the area of message communication. In the information world, rapid access to information and rapid response to messages is often critical to maintain a competitive edge or to be able to take advantage of rapidly changing opportunities. Many message services have been developed and are made available in various ways by service providers, and new such services are regularly under development. Such services include E-mail, facsimile, voice or pager or other wireless devices, and combinations of these and other modes. What is lacking in the prior art is an interface between these messaging systems and the multitude of web pages on the Global Information Network (Worldwide Web) where a user fills in information on a page, submits it to the provider of the web page, who then acts upon the information provided by either asking for further information, or executing the request of the user.

Among the many message services provided, most are essentially one-way in nature. That is, a service can notify you of an event or a trend, but you may not be able to make an immediate response, or the response may require access to a different apparatus than that upon which, or by which, the message was originally delivered.

Paging services have historically fit into the above-described category of no-response systems. Pagers and other 2-way wireless devices have recently been developed, however, that allow responses. These pager devices have buttons, usually two to full keyboard that provide for an incremental signal return. Such pagers also typically have a memory system allowing a number of pager messages to be stored and recalled. The activation of the different buttons and combinations of buttons may be recognized at the sender's facility. Pre-programmed code associated with the button signals may be executed, initiated by the receipt of the button signals.

With available responsive pager systems a single response is typically solicited and acted upon. There are also available interactive systems making use of the two-way pager's abilities wherein ongoing rounds of interactive selections may be made allowing a user to make specific selections out of a variety of options and/or to initiate the execution of specific actions based on certain types of information received. U.S. Pat. No. 5,838,252 issued to Kikinis on Nov. 17, 1998, INTERACTIVE TWO-WAY PAGER SYSTEMS, discloses a two-way pager system which is adapted for interactive process between a pager server and a subscriber carrying the pager. A first message sent by the pager server has labels for return buttons on the pager and in response to the subscriber selecting a return button the pager server sends a new message with new labels for the return buttons whereby the subscriber may further instruct the server. Systems are disclosed for stock transaction alerts wherein a subscriber can reprogram variables at the server, and for E-mail alerts and forwarding, wherein the subscriber can select and alter delivery types, such as voice, fax and so forth, and may also select multiple and alternative destinations for copies of the original message to be forwarded. In some embodiments a subscriber can select and return canned responses to the originator of a message, by pressing appropriate return buttons which the server matches with the canned responses.

The improvement disclosed by this invention takes interactive pager systems, or remote E-mail, one step farther by directly inputting the message sent by the user into a web page by the use of artificial intelligence software in the wireless server which is programmed to interact with the web page then inserts the proper components of the message into the proper locations on the web page.

It is therefore an object of this invention to disclose an interactive, wireless devices to on-line system, where a wireless device user can directly submit input information into a web page. It is a further object of this invention to give the user immediate responses as to the results of his inputs such that the user can execute a series of web pages as if he were sitting at his computer, observing the monitor, and inputting using a keyboard or mouse.

SUMMARY OF THE INVENTION

A two-way wireless device and wireless internet system is adapted for interactive communications between a subscriber using a wireless device, a wireless server, and an on-line service using a web page for the input of information. Systems are disclosed for stock transaction trading wherein a subscriber, using a wireless device interfaces to any one of numerous on-line stock trading services through a wireless server which uses agents, artificial intelligence software subroutines, which have been programmed to interact like a human using a web site, for alerts and stock trading.

BRIEF DESCRIPTION OF THE DRAWINGS

Other objects, features, and advantages of the present invention will become apparent from the detailed description of the invention, which follows, when considered in light of the accompanying drawings in which.

DESCRIPTION OF THE PREFERRED EMBODIMENT

Figure 1:
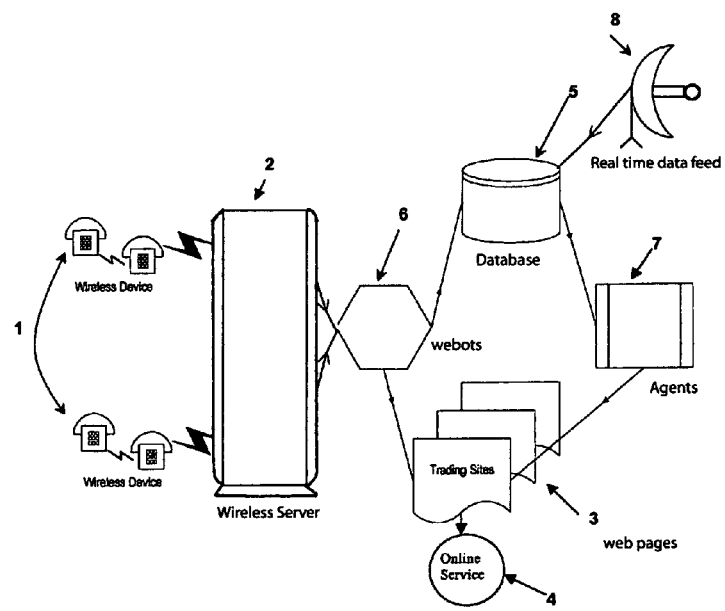
FIG. 1 is a block diagram of the system.

The present invention will now be described more fully hereinafter with reference to the accompanying drawing, in which the preferred embodiment of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A two-way wireless device and wireless internet system is adapted for interactive communications between a subscriber using a wireless device (1), a wireless server (2), and an on-line service (4) using a web page (3) for the input of information is shown. In the preferred embodiment this system is used for stock transaction trading wherein a subscriber, using wireless E-mail on a mobile computer, mobile phone, or a pager (1), interfaces to any one of numerous on-line stock trading services (4) through a wireless server (2) which uses agents (7), and webots (6) software subroutines, which have been programmed, to react like a human using a web browser (3), for E-mail alerts and stock trading. Of course those skilled in the art will recognizes this system could be implemented to accomplish a wide and varying assortment of task where wireless devices are used to interact with an on-line service.

The term webot (6) is short for web robot, which is a program that will do a certain task on its own once given the task. The webots (6) and agents (7) have become very popular software subroutines in recent years and are programs that can be written and implemented by programmers skilled in the art once the task is defined as disclosed in the component description listed below in this specification. In the preferred embodiment of this invention the webots (6) and agents (7) are implemented using Java 1.1.8 programming language.

This embodiment provides for wireless access to trading service through an electronic messaging interface. It is primarily a specialized E-mail server (2) that includes functionality for executing commands contained in E-mail messages sent to the server (2). This specialized E-mail server (2) includes software that is interactive such that it is designed to extract data from unstructured text through use of Agents (software subroutines) programmed to interpret web pages (3).

This embodiment supports commands for trading equities and retrieving financial and news information about equities. It executes trades when commanded to do so by a user. It executes these trades over the Internet by interfacing with specific online trading services (4).

This embodiment supports all popular online trading services (4). The online trading service (4) does not need to provide customized support for this embodiment because it is programmed to use the online trading service's (4) existing HTTP interfaces (3) for executing trades. From the perspective of the online trading service (4), trades executed through the interactive wireless devices (1) to on-line system (4) look exactly like trades executed by a human using a web browser (3).

This embodiment is unique in the following ways: It can be used by anyone with access to wireless Internet; It can execute trades against any online trading service (4); and, it is not limited to specific online services (4).

The preferred embodiment is implemented as an object-oriented server-based system (2), persisting necessary on-line data to disk using an in-production database (5) solution, e.g. the MS SQL database.

The preferred embodiment transmits data to and from wireless devices (1) using the custom security of different wireless platforms wherever possible for the appropriate wireless platform or can alternatively use direct connections to the paging company for improved speed, reliability, and security of the system.

In order to insure the validity of completed financial transactions, the system tracks and registers on the database (5) transactional checkpoints. The preferred embodiment monitors the progress of any one service request, and updates the database (5) in an appropriate fashion with status data. In the event there is a failure or timeout, the system rolls back subtasks of the current job, and tries again at an appropriate time.

The system has a graphical user interface (GUI) on the wireless device itself and therefore it is not necessary for the user to use complicated commands, rather the user will use a familiar interface similar to what he/she would view with a regular internet browser (MS Internet Explorer or Netscape Navigator).

The preferred embodiment meets the requirements of two functional use cases. First, the system allows the user to enter a security ticker symbol into their wireless device (1), address the message to the appropriate stock information service address (i.e. a specific E-mail address at the wireless server (2)), and receive a real-time quote back to the device (1). Second, the system facilitates the sending of simple commands to buy and sell a security.

A request for stock pricing information is carried out with a simple command input to the wireless device (1), along with the requested ticker symbol. The user addresses this E-mail to the E-mail address set up for the receipt of requests. After processing by the system, the user receives a textual message that indicates the last currently trading price of the security known to the system and stored in the database (5).

In a similar fashion, the user enters commands to initiate either the buying or selling of securities. The functional descriptions of both commands are similar. First, the user chooses simple commands from a menu, the number of shares, the functional name of an online service (4) the user is subscribed to and that they have identified to the system, and a valid user name and password. The system accepts the request, and returns either with confirmation of success (along with a confirmation/transaction number), or returns with a simple textual message of failure. Typical failure messages might be Internet-related and tracked by the system (ex. "Logon to eSchwab timed out"), or specific to the online site being used (ex. "There is not more credit left in your eSchwab account"). Upon failure, the user re-initiates the command if they would like to attempt again to succeed in the desired transaction.

The preferred embodiment employs a GUI interface to initiate desired actions. In addition, the response messages sent back to the device (1) are highly readable and informative.

A summary of user interface formatting follows:

UI Element

Format/Example

Request for pricing information
   Format: "price [ticker symbol]"
   Example: "price IQIQ"

Return of pricing information (success)
   Format: "The price of [ticker symbol] at [time stamp]on [date stamp] was [price]"
   Example: "The price of IQIQ at 11:31 AM on Sep. 1, 1998 was $45.25"

Return of pricing information (failure)
  Format: "There was an error attempting to retrieve the price of [ticker symbol]. The reason is '[error message]'"

Example

"There was an error attempting to retrieve the price of IQIQ. The reason is 'System down for maintenance'"

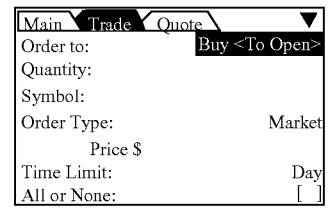

The above is the current GUI interface that is provided in the preferred embodiment.

The preferred embodiment employs programmed software agent (agents and webots) architecture to process and service requests from the user and is comprised of the following application sub-systems:

1. COMPONENT DESCRIPTION:
  Wireless Clients (1): This component is part of the wireless devices (1) and is used to send and receive messages to the server (2) through HTTP/HTTPS or SMTP.
  Server (2)—This receives messages from the wireless clients (2) and forwards them to the appropriate system webot (6). It also returns webot (6) responses back to the wireless clients (2).
  System webots (6):
  QuoteWebot (6)—The QuoteWebot (6) retrieves the trading information from the database (5) for the stock symbol submitted and sends back price, bid, ask, change and volume at which the stock is traded.
  TransactionWebot (6)—The TransactionWebot (6) receives the buy, buy to cover, sell, or sell short request and inserts the transaction in the database (5) to be executed by the Trading Agent (7).
  CancelWebot (6)—The CancelWebot (6) checks the database (5) whether the order has been executed, and if not inserts a cancel request in the database (5).
  OrderStatusWebot (6)—The OrderStatusWebot (6) checks the status of an order placed with the trading site (3) and sends back the information to the user.
  TradeHistoryWebot (6)—The TradeHistoryWebot (6) creates a connection with the trading site (3) and retrieves the trading history of the user.
  PositionsWebot (6)—The PositionsWebot (6) creates a connection with the trading site (3) and retrieves the trading positions of the user (e.g. stock and number of shares held).
  BalanceWebot (6)—The BalanceWebot (6) allows the user to check his/her account balance with the trading site (3).
  Agents: (7)
  Transaction agent (7) will execute pending transactions from the database (5) and notify the user via email that the order has been placed along with the trading site's (3) confirmation number.
  Confirm agent (7) will monitor the status of pending transactions and will notify the user via email when a trade has been completed.
  Cancel order agent (7) will cancel transactions that have not been completed and notify the user via email whether the transaction was canceled.
  Database (5) contains tables representing users, transactions, and stock quotes. The database (5) is the persistence mechanism for all necessary transactional logging information, as well as the source of pricing data (original source is the real-time pricing feed (8)). In addition, the database (5) tracks specifics on trading sites (3) the user is allowed to identify as one for conducting trades on the user's behalf, and all other user-specific parameters regarding this functionality.

The preferred embodiment uses standards-based communications channels to initiate a transactional session for the user, either to gather ("pull") specific security pricing information, or to initiate and receive verification of a device-generated trade request. Namely, the preferred embodiment employs Internet protocols—HTTP/HTTPS, SMTP, or direct connection to the paging company, for all interactions with the wireless devices (1) of its user base. Messages to the wireless devices (1) are delivered by sending a message via the internet from the system to the outgoing server (2), with proper addressing for delivery to the specific user's wireless (1) device E-mail gateway server. This service provider is then responsible for the successful wireless delivery of the textual message to the wireless device (1).

Likewise, sending requests to the system from a wireless device (1) happens through the wireless service provider's gateways. Messages from the wireless device (1) are formatted by the service as a request via the appropriate internet protocol, and sent from the provider's server through the Internet to the mail server (2). The system employs the server (2) to receive incoming messages requesting an initiation of trades or for specific pricing data. The system then parses relevant text and initiates internal service request fulfillment.

The messages sent and received from the system are the result of activity of the webot (6) processes. The quote webot (6) and the transaction webot (6) employ the server (2) to receive messages containing commands from the user. Each service employs a separate address to send and receive messages from (ex. price@goidb.com and http://trade.goidb.com). These webots parse valuable data from the initial commands sent, and verify correct passing of parameters.

The quote webot (6) proceeds to log onto the production database (5), passes the database (5) a SQL query for receipt of the latest pricing data given the ticker symbol (as well as various other results data, such as pricing date/time), creates a message to the user (indicating the valid results or an error), and sends the user a message from the server (2).

The transaction webot (6), after correctly parsing parameters for the desired command, first logs onto the production database (5) and verifies the user's login id and password, and the trading site token input by the user. If this is one of the allowed sites (set up by the user) in the user's setup, the transaction webot (6) retrieves the site username and password from the database (5), and passes relevant parameters to the database (5) that notifies the transaction agent (7) to carry out the transaction on the trading site (3). The transaction agent (7) logs transaction activity to the database (5), and returns a parameter string to the transaction webot (6). The transaction webot (6) then communicates these results back to the user in the appropriate formats and sends them through the server (2).

The other webots (6) and agents (7) carry out similar functions in the same manner as described above in the system components.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the dependent claims.

The invention claimed is:

1. A two-way wireless device system adapted for interactive communications between a subscriber and an on-line service comprising:
   a wireless device;
   a wireless server;
   said wireless device and said wireless server being in communication such that a message can be transmitted between said wireless device and said wireless server;
   said message containing user information and request information; an on-line service;
   said on-line service having a web page for data input;
   said data input being automatically accomplished by said wireless server using agents;
   said agents being software subroutines contained on said wireless server;
   said agents being programmed to independently interact without user input with said web page of said on-line service for data input of said request information to said on line service;
   a database;
   said database capable of receiving and storing said request information and said user information sent from said wireless server after said request information and said user information has been parsed from said message;
   said database containing authorized user information allowing authentication of users;
   said database capable of comparing said user information sent from said wireless server to said authorized user information stored in said database to authenticate users;
   said agents being programmed to independently interact without user input with said web page of said on-line service for retrieving output data from said web page of said on-line service in response to data input from said agents in response to said request information and sending such output data in the form of an output message information to said database;
   said database capable of receiving and storing said output message information sent from said agents;
   said database capable of returning said output message information stored in said database to said wireless server for sending said output message from said wireless server to said wireless device;
   an interest information feed, said interest information feed being a source of real time information regarding a subject of interest to users;
   said database having said real time information automatically fed into said database from said interest information feed;
   said database capable of comparing said request information with said interest information stored in said database and creating and storing an interest information output message; and,
   said database capable of returning said interest information output message stored in said database to said wireless server for sending said interest information output message from said wireless server to said wireless device.

2. The two-way wireless device system of claim 1 wherein:
   said wireless device is a pager using wireless email.

3. The two-way wireless device system of claim 1 wherein:
   said wireless device is portable computer using wireless email.

4. The two-way wireless device system of claim 1 wherein: said wireless device is a mobile telephone using wireless email.

* * * * *